United States Patent
Samareh Abolhasani et al.

(10) Patent No.: US 12,430,184 B2
(45) Date of Patent: Sep. 30, 2025

(54) PREDICTIVE QUOTA MANAGEMENT FOR CLOUD CUSTOMERS

(71) Applicant: Microsoft Technology Licensing, LLC, Redmond, WA (US)

(72) Inventors: Banafsheh Samareh Abolhasani, Irvine, CA (US); Arjun Mukherjee, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 533 days.

(21) Appl. No.: 17/709,993

(22) Filed: Mar. 31, 2022

(65) Prior Publication Data
US 2023/0315537 A1    Oct. 5, 2023

(51) Int. Cl.
*G06F 9/50*    (2006.01)
*G06F 11/34*    (2006.01)

(52) U.S. Cl.
CPC ........ *G06F 9/5077* (2013.01); *G06F 11/3438* (2013.01)

(58) Field of Classification Search
CPC .... G06F 9/5077; G06F 11/3438; G06F 9/505; G06F 9/5072; G06F 2209/5019; G06F 2209/504
See application file for complete search history.

(56) References Cited

U.S. PATENT DOCUMENTS

| | | | |
|---|---|---|---|
| 9,942,117 B1 * | 4/2018 | Saini | H04L 41/14 |
| 10,009,246 B1 * | 6/2018 | Benattar | H04L 43/04 |
| 10,491,541 B2 | 11/2019 | Dettori et al. | |
| 10,606,661 B2 | 3/2020 | Dao et al. | |
| 10,609,208 B2 | 3/2020 | Skogen et al. | |
| 10,725,735 B2 | 7/2020 | Guttmann | |

(Continued)

FOREIGN PATENT DOCUMENTS

CN    114254841 A    3/2022

OTHER PUBLICATIONS

Jiang, et al., "Optimal Cloud Resource Auto-Scaling for Web Applications", In Proceedings of 13th IEEE/ACM International Symposium on Cluster, Cloud, and Grid Computing, May 13, 2013, pp. 58-65.

(Continued)

*Primary Examiner* — Sisley N Kim
(74) *Attorney, Agent, or Firm* — Holzer Patel Drennan

(57) ABSTRACT

A cloud compute resource provider implements a method for automatically adjusting a quota of compute resources allocated to an individual customer subscription. The method includes determining a current usage metric for the individual customer subscription for a recent time interval; determining whether a subscription-based historical usage model has been trained on historical usage data of the individual customer subscription; and responsive to determining that the subscription-based historical usage model has been trained, executing the subscription-based historical usage model to generate a future resource usage metric predicting a usage of the customer subscription over a future time interval; and outputting a recommended adjusted resource quota for the individual subscription, the predicted future resource usage metric satisfying a target utilization of the recommended adjusted resource quota.

20 Claims, 7 Drawing Sheets

(56) References Cited

U.S. PATENT DOCUMENTS

| | | | |
|---|---|---|---|
| 2014/0068624 | A1 | 3/2014 | Fuller et al. |
| 2015/0372881 | A1 | 12/2015 | Byrne et al. |
| 2020/0027014 | A1 | 1/2020 | Wen et al. |
| 2021/0067423 | A1* | 3/2021 | Newman ................. H04L 43/55 |
| 2023/0099475 | A1* | 3/2023 | Bhargava .............. G06F 16/245 |
| | | | 707/770 |
| 2023/0236897 | A1* | 7/2023 | Kumar ................... G06F 9/505 |
| | | | 718/104 |

OTHER PUBLICATIONS

"International Search Report and Written Opinion issued in PCT Application No. PCT/US2023/010641", Mailed Date: Mar. 24, 2023, 13 Pages.

"AWS Service Limits", Retrieved From: https://web.archive.org/web/20220215190648/https:/docs.aws.amazon.com/general/latest/gr/aws_service_limits.html, Feb. 15, 2022, 2 Pages.

"Managing Service Quota", Retrieved From: https://web.archive.org/web/20211102162825/https:/cloud.google.com/service-usage/docs/manage-quota, Nov. 2, 2021, 9 Pages.

\* cited by examiner

PREDICTIVE QUOTA MANAGEMENT FOR CLOUD CUSTOMERS

BACKGROUND

Software as a service (SaaS) is a software licensing and delivery model in which software is licensed on a subscription basis and is centrally hosted. SaaS providers face challenges in apportioning computing resources, such as processing and data storage resources, to different tenants that lease those services. A tenant is, for example, an enterprise with a web-based presence that provides either a web-based service or sells goods through the web. Individual customers (end users) may, for example, create subscriptions (user accounts) through a tenant-owned website to subscribe to a service offered by the tenant that is facilitated through computing resources leased by a SaaS provider.

Resources may be statically or dynamically allocated among tenants. At a finer level of granularity, resources may also be statically or dynamically allocated among individual customer subscriptions associated with a tenant. These allocations are commonly referred to as "quotas." A quota provides a set max cap on compute resources that are available to a given entity at a single point in time. The use of quotas ensures that all parties sharing access to a pool of compute resources are guaranteed some baseline level of access to those compute resources despite fluctuating activity levels of other parties sharing access to the pool.

In different systems, quotas are set in different ways. Ideally, an individual subscription is provided with a quota that is large enough to meet the needs of the associated subscriber without excessive surplus (allocated resources that remain tied up but unused). However, the compute needs of an individual subscriber may change in time. Many existing systems require individual users to take affirmative action to increase their allotted quotas in anticipation of usage increases. For example, a customer may be prompted to open a ticket to request a quota increase when the customer's compute resource usage hits some threshold of their current quota, such as 90%.

Requiring end users to manually open support tickets to increase their quotas before anticipated usage spikes is burdensome and may incentivize requests for larger-than-necessary quota increases so as to reduce the likelihood of having to repeat such requests in the future.

SUMMARY

According to one implementation, a method provides for automatically adjusting a quota of compute resources allocated by a cloud compute resource provider to an individual customer subscription. The method provides for determining whether a subscription-based historical usage model has been trained on historical usage data of the individual customer subscription. In response to determining that the subscription-based historical usage model has been trained, the subscription-based historical usage model is executed, with a current usage metric as an input, to generate a future resource usage metric. The future resource usage metric predicting a resource usage for the customer subscription over a future time interval. A recommended adjusted resource quota is generated for the individual subscription, where the predicted future resource usage metric satisfies a target utilization of the recommended adjusted resource quota.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

The herein disclosed technology provides a predictive automated approach to adjusting compute resource quotas for customers that utilize cloud-based services. As used herein, "customer" refers to a subscriber of a web-based service that is provided by a tenant, where the tenant is a party that leases cloud-based compute resources from a cloud compute resource provider. By example, the cloud compute resource provider may be Microsoft Azure, while the tenant is, for example, an online retailer and the customer is a party with an account hosted by the online retailer—e.g., either a vendor that sells goods through the online retailer or a buyer that purchases such goods.

In one implementation, the herein disclosed technology provides for automatically adjusting quotas to shared compute resources on a per-customer basis in a way that is uniquely individualized to the compute resource needs of an individual customer subscription. In various approaches, the disclosed methods provide for modeling usage trends on a per-subscription basis (e.g., single customer subscriptions), such as based on subscription-specific usage models and/or industry-wide usage trends.

The proposed solutions reduce the burden on individual customers to monitor their respective usages and/or to negotiate quota increases in anticipation of usage increases while likewise mitigating resource waste that occurs through unnecessary over-allocations of compute resources. The herein proposed solution is seamless to the customer and allows flexibility to adjust for individual customer needs and business types.

Figure 1:
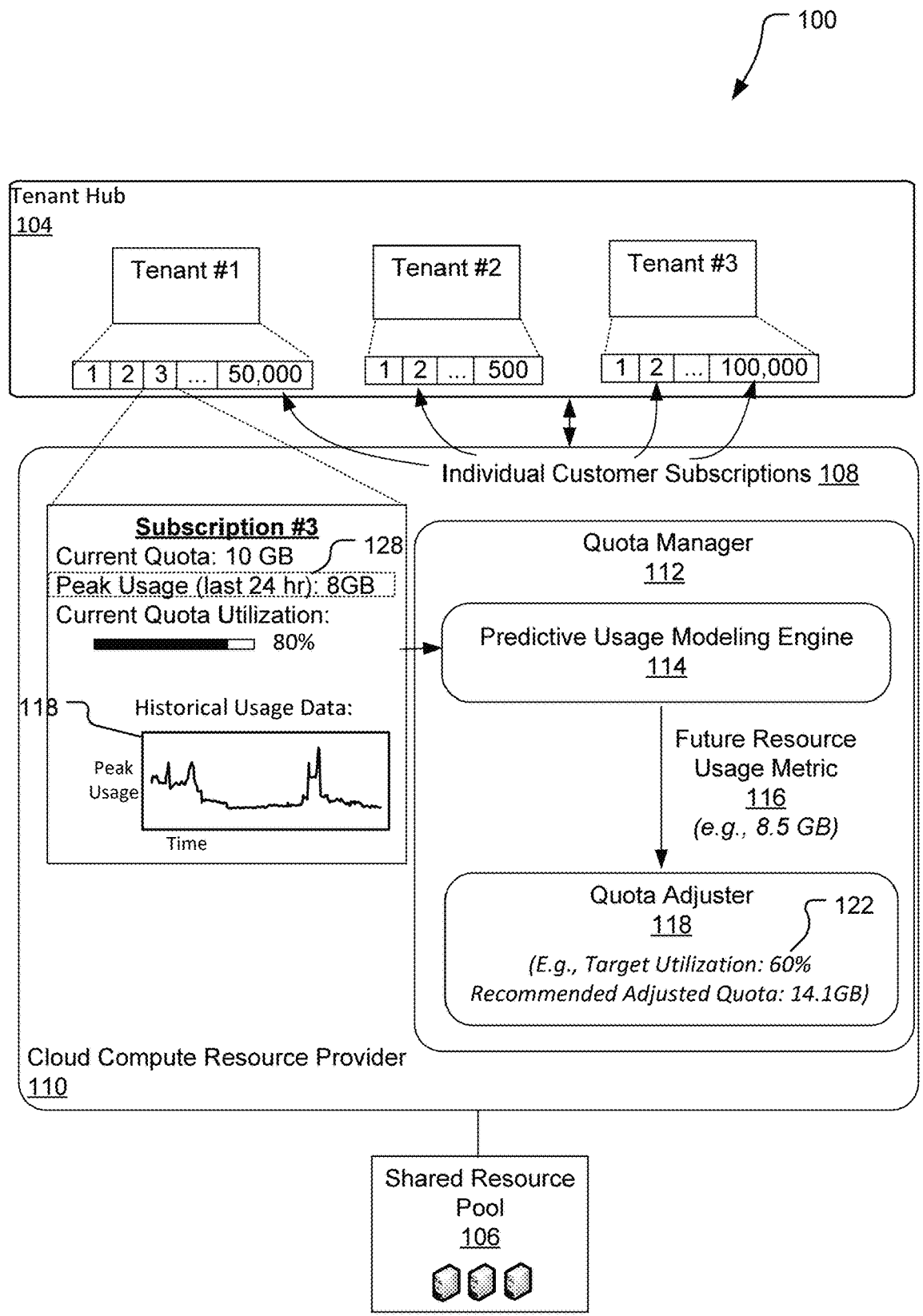
FIG. 1 illustrates an example resource allocation system that applies predictive usage modeling methodologies to automatically manage quota for customers utilizing cloud-based services that are supported by resources within a shared resource pool.

FIG. 1 illustrates an example resource allocation system 100 that applies predictive usage modeling methodologies to automatically manage quotas for customers utilizing cloud-based services that are supported by resources within a shared resource pool 106. The resource allocation system 100 includes a cloud compute resource provider 102 that leases compute resources (e.g., storage and processing) of the shared resource pool 106 to individual tenants. In FIG. 1, a group of three tenants are shown within a tenant hub 104. In an actual implementation, the tenant hub 104 may support tens or hundreds of tenants. The tenants in the tenant hub 104 may be understood as web-based service providers that provide an online service through a website which is associated with customer subscriptions 108 (individual user accounts). Data of the tenant website and associated individual customer subscriptions 108 may be stored on the resources of the shared resource pool 106 and compute tasks initiated by users interacting with the tenant website may be performed by processing resources of the shared resource pool 106.

The number of individual customer subscriptions 108 associated with each different tenant may vary from one tenant to another, such in the range of a few hundred subscriptions to several hundred thousand subscriptions. Each one of the individual customer subscriptions 108 may be understood as being a customer account associated with a singular login and password to the access the tenant-owned web-based service.

Each one of the individual customer subscriptions 108 is allocated a quota of the resources from the resource pool that is, per the disclosed technology, automatically (without customer input) adjusted over time on an as-needed basis. In different implementations, the quota may have different units, such as units of storage or memory. The cloud compute resource provider 110 imposes safeguards that prevent any of the individual customer subscriptions from exceeding their associated quota at a given point in time, thereby preventing scenarios where high-activity subscriptions consume all available resources leaving insufficient resources for low-activity subscriptions.

The cloud compute resource provider 110 includes a quota manager 112 that intelligently recommends quota adjustments for the individual customer subscriptions 108 on an as-needed (forward-looking) predictive basis. Recommendations rendered by the quota manager 112 may be automatically or discretionarily implemented by the cloud compute resource provider 110 without notice or action on the part of end users (e.g., the customers with logins to the individual customer subscriptions 108).

This automated approach to quota adjustment prevents users from being burdened with the need to negotiate quota increases while also effecting system-wide allocations that are highly efficient due to the adjustment of quotas at the individual account level (e.g., by reducing over-allocations). In addition, the individualized approach to modeling and quota adjustment allows for high level of consistency in accord with preselected target utilization metrics, thereby preventing users from being inconvenienced by service disruptions that may otherwise occur if and when quota limits are exceeded.

In FIG. 1, the quota manager 112 is shown to include both a predictive usage modeling engine 114 and a quota adjuster 118. The predictive usage modeling engine 114 applies usage models trained on individual subscriptions and/or groups of subscriptions (discussed below with respect to "seasonality modeling") to generate a predicted future resource usage metric 116 for a singular one of the individual customer subscriptions 108. For example, the predicted future resource usage metric 116 estimates a usage for one of the individual customer subscriptions 108 over a near-future time interval, such as the next 24 hours. The quota adjuster 118 determines a recommended adjusted quota 120 based on the predicted future resource usage metric 116 and either automatically updates the customer subscription quota or provides the recommendation to another party (e.g., a manager or other compute engine) for discretionary implementation.

The predicted future resource usage metric 116 may, in different implementations, be generated in different ways. In one implementation, the predicted future resource usage metric 116 is generated by a model that is trained on historical usage data for an individual customer subscription. For example, a model associated with a given customer subscription ID is trained exclusively on historical usage data collected for the subscription over a recent period of time, such as over the past 90 days. At runtime, the predictive usage modeling engine 114 receives the subscription ID and selects the relevant historical usage model to apply to generate the predicted future resource usage metric 116.

In one implementation, the predicted future resource usage metric 116 is an estimate of resource usage for a single customer subscription over a near-future period of time, such as the next 24 hours. Given the predicted future resource usage metric 116, the quota adjuster 118 determines a recommended adjusted quota 120 for the customer subscription. In one implementation, the recommended adjusted quota 120 is determined based on a predefined target utilization 122 of the allotted quota where the target ensures the customer subscription has sufficient resources but not an excessive surplus. If, for example, the target utilization is 60% and the predicted future resource usage metric is 8.5 GB, the quota manager 112 may recommend an adjusted quota of 14.1 GB (because 60% of 14.1 is 8.5). In some implementation, the quota adjuster 118 performs a number of "checks" before automatically implementing or recommending a quota adjustment, such as checks to ensure consistency with regional capacity and to potentially detect fraudulent usage. These and other exemplary checks are discussed in more detail below with respect to FIG. 4 below.

In one implementation, historical usage models are trained for a subset of the individual customer subscriptions 108 for which threshold quantity of historical usage data is available on the platform of the cloud compute resource provider 110. For example, a model may be trained on 90 days or more customer usage data. If insufficient usage data is available for a given customer subscription, the predictive usage modeling engine may use an alternative type of model to generate the predicted future resource usage metric 116. One alternative model type uses a type of data referred to herein as "seasonality data" from subscriptions associated with similar industries. This seasonality model is discussed in detail with respect to FIG. 2.

The quota manager 112 may, in various implementations, perform modeling to recommend quota adjustments responsive to satisfaction of different usage events. For example, the quota manager 112 may initiate the aforementioned modeling when usage activity for a given customer subscription satisfies a threshold, such as when an upward usage trend has been detected for a set number of days, when a current usage metric 128 of the customer subscription represents a maximum usage of given evaluation period, or when other predefined events indicative of a potential increase in usage are detected.

Notably, the predictive usage modeling engine 114 performs modeling at a fine granularity level of a single one of the individual customer subscriptions 108. This results in predictive usage metrics and corresponding quota adjustments that are much more in-line with target utilization metrics due to the fact that individual user behaviors may follow trends that are not consistent across groups of users. For example, modeling performed on a per-tenant basis results in deviations from a target utilization metric (e.g., a target of 60% of allotted quota usage at all times) that at are greater than that observed when the herein disclosed single-customer-single-model approach is applied.

Figure 2:
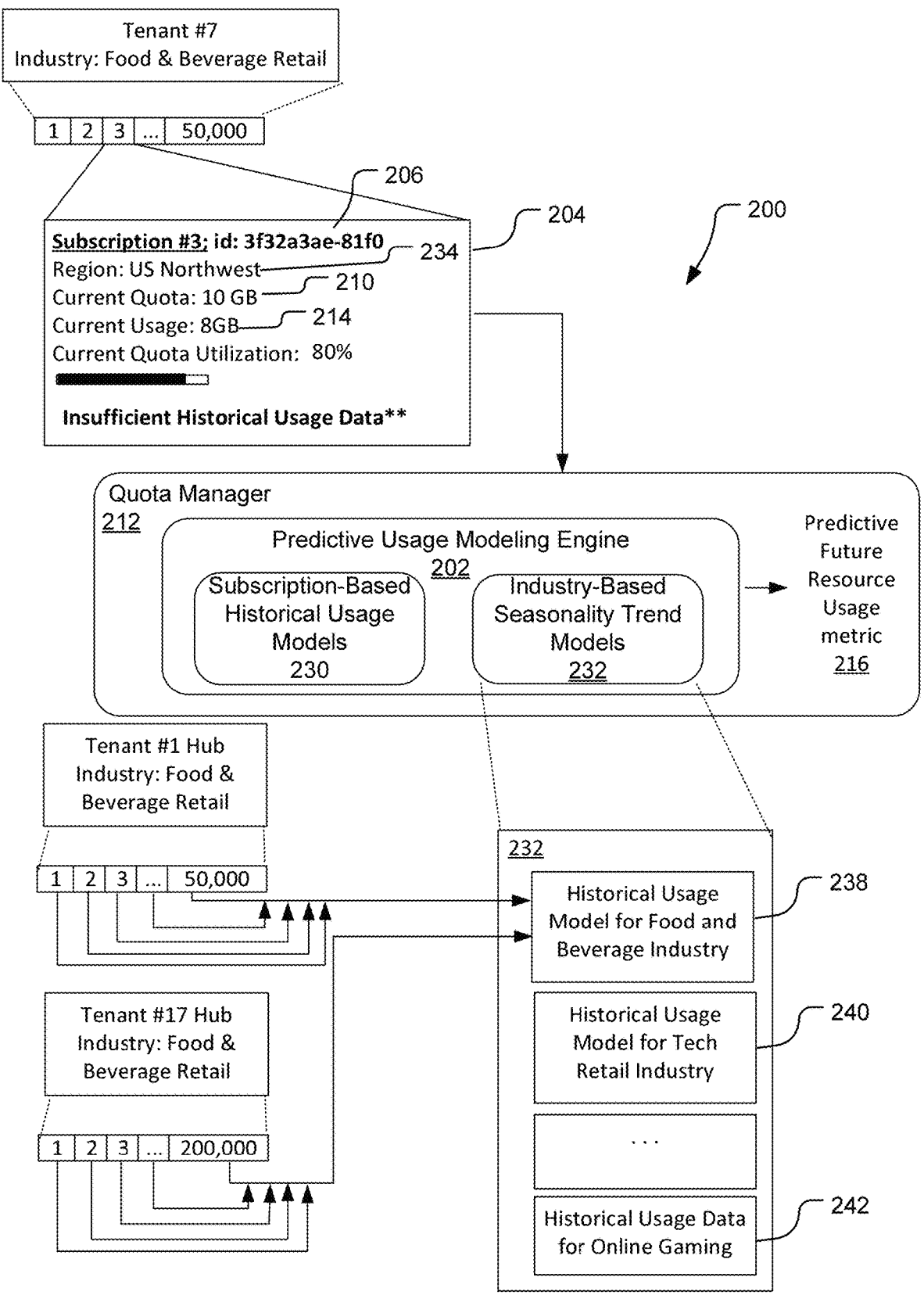
FIG. 2 illustrates further exemplary aspects of a resource allocation system that applies predictive modeling techniques to provide subscription-specific quota management.

FIG. 2 illustrates further exemplary aspects of a resource allocation system 200 that applies predictive modeling techniques to provide subscription-specific quota management. The resource allocation system 200 includes a quota manager 212, which may be understood as including some or all of the subcomponents described with respect to the quota manager of FIG. 1 and performing functionality consistent with that described with respect to the system of FIG. 1. Among other software components, the quota manager 212 includes a predictive usage modeling engine 202. The predictive usage modeling engine 202 performs actions for predictive modeling and outputs predictive metrics that are used by to automatically adjust quotas for associated individual customer subscriptions 108 to a tenant service supported by compute resources of the resource allocation system 200.

In an example of FIG. 2, the quota manager 212 receives inputs 204 associated with a particular customer subscription (subscription #3) to a web-based service that is provided by a tenant leasing compute resources from the resource allocation system. In this example, the tenant (e.g., Tenant #7) is a service provider in the food and beverage industry. The customer subscription may be, for example, an online account associated with a username and password that a customer uses to order delivery food from a local establishment owned by the tenant.

By example, the inputs 204 of FIG. 2 are shown to a subscription ID 206 (an identifier that uniquely identifies the customer subscription), a region identifier 234 (e.g., "US northwest") indicating a geographical region where the customer is based, a current quota 210 allotted to the customer subscription, and a current usage metric 214 associated with the customer subscription. In one implementation, the quota manager 212 periodically or continuously monitors and evaluates the inputs 204 to determine whether to run a predictive model to generate a predictive future resource usage metric 216 for the particular customer subscription. For example, the quota manager 212 may implement logic that provides for performing the predictive modeling responsive to certain trends in usage, such as when an increase in the current usage metric 214 is observed over a set time period or when a current quota utilization (e.g., percent of currently-allocated quota being used) exceeds a target. In some implementations, the quota manager 212 initiates periodic modeling rather than event-triggered modeling. For example, models may be run for each customer subscription on a daily basis.

In one implementation, the current usage metric 214 indicates an average of peak usage over a recent interval, such as the past 24 hours. For example, peak resource usage may be recorded every hour for the subscription and the hourly values may be averaged and reported once per day as the current usage metric 214. Although FIG. 2 illustrates a current utilization (e.g., 80%), this metric may be readily calculated as the ratio of the current usage metric 214 divided by the current quota 210.

The predictive usage modeling engine 202 stores multiple pretrained models that are discussed in detail below. Some of these models are subscription-based historical usage models 230 while other models are industry-based seasonality trend models 232. In general, the subscription-based historical usage models are models that are each trained on usage history for an individual customer subscription, while the industry-based seasonality trend models 232 are models that area each trained on a collection of customer subscription data pertaining to different subscriptions associated with a same industry as the service provided in association with the customer subscription being assessed for quota adjustment.

In one implementation, the quota manager 212 performs actions to automatically train historical usage models for customer subscriptions that have existed on the shared resource allocation system 200 long enough for there to exist a threshold quantity of historical usage data for the subscription, such as 90 days of usage history or other quantity of data that is deemed sufficient, through repeated modeling efforts and error observation, to guarantee some confidence in accuracy of the predictive future resource usage metric 216 that is to be output by the select one of the subscription-based historical usage models 230 that is trained on the data.

By example, the subscription-based historical usage model 230 may be a predictive model that is trained on the usage history of a single individual customer subscription. Although a variety of models may be suitable, one implementation of a subscription-based historical usage model employs a random walk with drift algorithm to compute, from historical usage data of a customer subscription spanning several days, a predicted peak resource usage of the customer subscription for a near-future term interval, such as for the next 24 hours. This predicted 24-hour peak resource usage is one example of the predictive future resource usage metric 216.

Existing subscription-based historical usage models may be updated (retrained on more recent data) periodically, such as every two weeks, monthly, etc.

The quota manager 212 provides the subscription ID 206 to the predictive usage modeling engine 202, and the predictive usage modeling engine 202 determines whether a subscription-based historical usage model has been previously created for the customer subscription associated with the subscription ID 206. In scenarios where the predictive usage modeling engine 202 determines that a subscription-based historical usage model 230 has been previously created for the customer subscription associated with the subscription ID 206, the relevant model is identified and executed using some or all of the inputs 204 to generate the predictive future resource usage metric 216.

In the example of FIG. 2, tenant #7 is in the food and beverage retail industry. The quota manager 212 determines that because the customer subscription associated with the subscription ID 206 is relatively new, there is insufficient historical usage data available for the customer subscription on the platform. Consequently, a subscription-based historical usage model has not yet been created for the customer subscription. In this scenario, predictive usage modeling engine 202 attempts to identify an applicable one of the industry-based seasonality trend models 232 that can be used to generate the predictive future resource usage metric 216. The industry-based seasonality trend models 232 are each jointly trained on industry-specific historical usage data for customer accounts associated with services belonging to a same general industry as the service that is provided by the tenant associated with the customer subscription.

As shown in view 236, the industry-based seasonality trend models 232 include a collection of models generated for different industries such as a historical usage model for the food and beverage retail industry 238, a historical usage model for the tech product retail industry 240, and a historical usage model for the online gaming industry 242. Each of these industry-based seasonality trend models is jointly trained on historical usage data for many (e.g., thousands) of customer subscriptions to web-based services belong to a same industry. For example, the historical usage model for the food and beverage retail industry 238 is a model trained on resource usage data for customer subscriptions associated with multiple different tenants (e.g., tenant #1, tenant #17) of the shared resource allocation system 200 that are also providing web-based services in the food and beverage industry.

In one implementation, each of the industry-based seasonality trend models 232 is based on historical resource usage data collected with respect to multiple different subscriptions to a service associated with a single specified industry over a significant time period, such as multiple years (e.g., 3 years). The usage data is analyzed for trends and patterns that repeat in time. Usage time series often have multi-period seasonality as a result of different business functions. For instance, services pertaining to online retail may have a usage time series that repeat each quarter (seasonal sales), while services pertaining to online education may have a seasonality that repeats each year.

This time interval in which general usage trends repeat with respect to a given industry is referred to herein as a seasonality window. For example, certain retailers may annually experience spikes in usage during certain months of the year, such as due online holiday shopping, or on certain days (e.g., semi-annual sale, Labor day sale). Other types of service providers may experience spikes in customer subscription usage that is periodic on some other basis, such as every four weeks, two weeks, etc. To fit and forecast these effects, seasonality models can be generated as periodic functions of time for a given industry or subset of an industry. In one implementation, the seasonality window for a given industry is computed using a Fourier series to provide a flexible model of periodic effects Once the seasonality window is determined for a particular industry, the seasonality window can be used by the associated one of the industry-based seasonality trend models 232 as a basis for generating the predictive future resource usage metric 216. If, for example, the food and beverage industry experiences usage trends that repeat every week (e.g., people order delivery food on Thursdays or place on-line grocery orders on Saturdays), then a moving average can be computed based on that weekly seasonality window. For example, the historical time series of aggregated usage data for same-industry services can be deconstructed to identify seasonal peaks and valleys that periodically repeat. The identified peaks and valleys can then be used to discern industry-specific trends. For example, through statistical techniques, a seasonality increase may be identified for Thursday, Friday and Saturday in a given week. This information can be used by an applicable one of the industry-based seasonality models 232 to better predict usage for any customer subscription associated with the same industry (e.g., subscription #3 of tenant #7, for which there is insufficient historical usage data to generate a subscription-based historical usage model).

In this manner, the industry-based seasonality trend models provide a basis for intelligently predicting future increases and decreases in resource usage with respect to customer subscriptions that are new or that, for other reasons, lack sufficient individualized historical usage data to individually train a reliable predictive model.

In still another implementation, an industry-specific seasonality window is computed as described above and used to tailor a training dataset for a subscription-based historical usage model (e.g., one of the models 230). For example, industry-specific seasonality data can be used to de-trend and de-seasonalize subscription usage data for a single customer subscription, allowing for the computation of seasonal indices within each determined industry-specific seasonality window for that subscription. In one implementation, identified seasonal indices are used to uplift the base 50th percentile values in the set of usage data for a single customer subscription while keeping the overall usage distribution shape the same. This is beneficial because it allows the subscription-based historical usage models 230 to be run less frequently while providing a better prediction of future seasonal peaks and valleys that holds true over a longer interval (e.g., the duration of the identified industry-based seasonality window).

Figure 3:
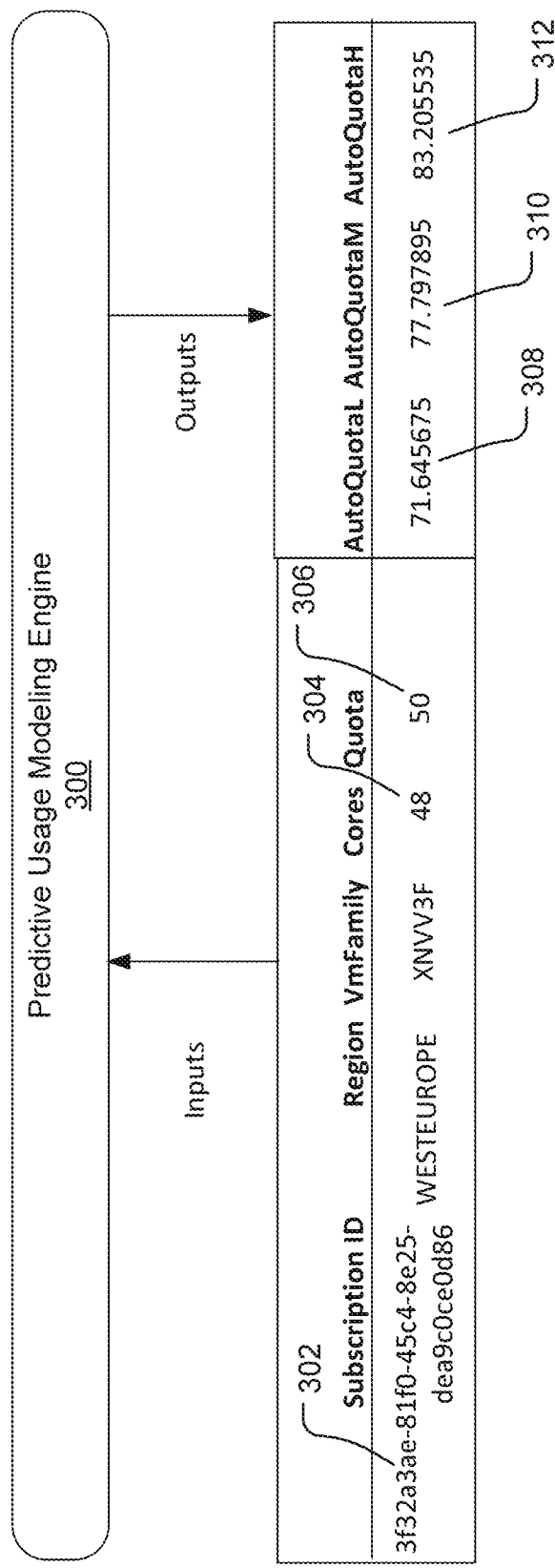
FIG. 3 illustrates example inputs and outputs of a quota manager that is implemented in a cloud-based resource allocation system to provide predictive subscription-specific quota management

FIG. 3 illustrates example inputs and outputs of a quota manager 300 that is implemented in a cloud-based resource allocation system to provide predictive subscription-specific quota management. As inputs, the quota manager 300 receives a subscription ID 302 identifying a particular customer subscription. The quota manager 300 also receives a current usage metric 304 for the customer subscription (e.g., 48 cores). In one implementation, the current usage metric 304 indicates a 24 hour average of hourly peak usage. The quota manager 300 further receives a current quota 306 (e.g., a customer-selected quota, default initial quota, or previously-adjusted quota), that represents the current resource quota allocated to the customer subscription (e.g., 50 cores). With this information, the quota manager 300 identifies an applicable predictive model (e.g., one of the subscription-based historical usage models 230 or industry-based seasonality trend models 232 of FIG. 2) and executes the predictive model with the current usage metric 304 and/or the current quota 306 provided as inputs. The predictive model outputs a predicted future resource usage metric (not shown) which is, in turn, used to generate one or more recommended adjustments 308, 310, 312 to the current quota 306, where the adjustments are each sufficient to account for a change in the usage that is predicted by the predicted future resource usage metric.

In one implementation, the quota manager 300 recommends quota adjustments that are designed to ensure usage consistency with a preselected target utilization. If, for example, a target utilization is 70%, the quota manager 300 recommends a new, adjusted quota representing a value that the predicted future resource usage metric is 70% of. In the illustrated implementation, the quota manager 300 makes three different quota recommendations including a lower-end quota adjustment 308, a higher-end quota adjustment 312, and a middle-ground adjustment 310, each of which can be discretionarily implemented in the alternative.

In one implementation, a system manager discretionarily selects the adjusted quota from amount the different options (e.g., 308, 310, 312) output by the quota manager 300. In other implementations, the selection is performed automatically by further logic of the quota manager 300. In one implementation, the selection of the quota adjustment from various different outputs (e.g., 308, 310, 312) is based on a region ID associated with the customer account. For example, certain regional facilities may have limited capacities at certain points in time such as due to outages (repairs in progress) or regional events being supported by resources at the facility. In these instances of decreased regional capacity, the lower-end quota adjustment 308 may be selectively implemented. In other regional facilities with ample capacity, the higher-end 312 quota adjustment may be selectively implemented.

Figure 4:
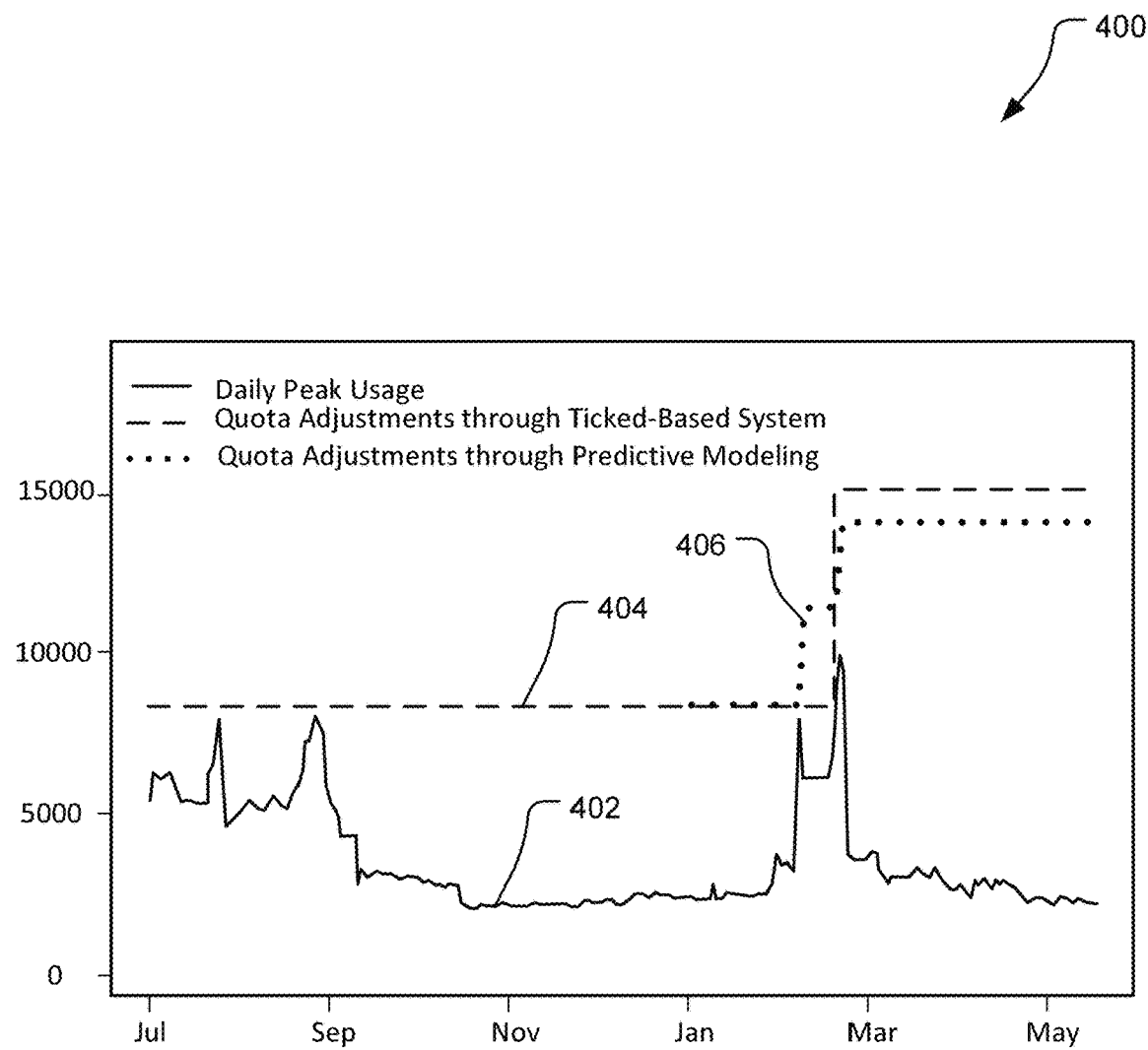
FIG. 4 illustrates an example plot modeling the efficacy of various methods of adjusting a resource quota allocated to an individual customer subscription by a cloud compute service provider.

FIG. 4 illustrates an example plot 400 illustrating the efficacy of various methods of adjusting a resource quota allocated to an individual customer subscription by a cloud compute service provider. Specifically, the plot 400 illustrates a comparison between a manual ticket-based system and a predictive modeling approach, such as an approach consistent with the system described herein with respect to any of FIG. 1-3. A first line 402 illustrates daily peak usage for an individual customer subscription over a number of months. A second line 404 illustrates actual quota adjustments that resulted from a user opening manual tickets to request quota increases. A third line 406 indicates the quota adjustments recommended by a subscription-based modeling solution trained on historical usage data for the customer subscription shown. According to one implementation, the subscription-based modeling solution executes a random walk with drift model trained on the last three months of usage data for the customer subscription. Each time the model is run, it is provided with at least a current usage metric (e.g., an average peak usage for the past 24 hours) and the current quota allocated to the customer subscription.

The trends shown by the first line 402 illustrate some growth over time but also significant volatility, with large usage spikes occurring during the months of February and March. As shown by the second line 404, the customer's quota was increased near the beginning of March responsive to the customer's opening of a manual ticket. While the resulting quota increase provided the customer subscription with sufficient resources to avoid hitting the quota cap at any point in time, the resources actually allocated per the ticket-based system far exceeded those actually used by the customer subscription in following months. In contrast, the modeling solution illustrated by the third line 406 includes step-wise increments that were also sufficient to avoid the cap but much more efficient in the sense that fewer overall resources were allocated.

Figure 5:
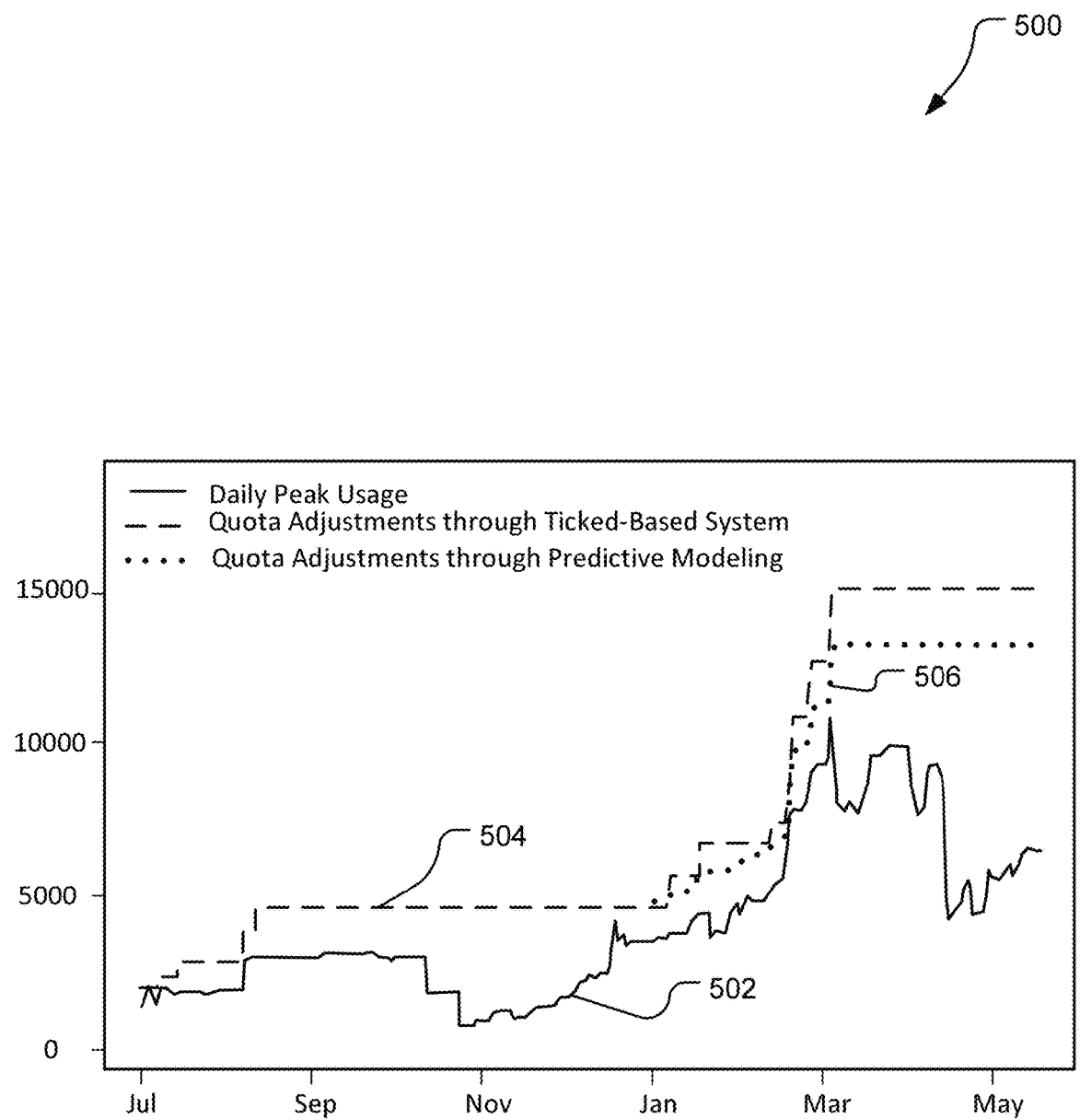
FIG. 5 illustrates another example plot modeling various the efficacy of various methods of adjusting a resource quota allocated to an individual customer subscription by a cloud compute service provider.

FIG. 5 illustrates another example plot 500 illustrating the efficacy of various methods of adjusting quota allocated to an individual customer subscription by a cloud compute service provider. A first line 502 illustrates daily peak usage for an individual customer subscription over a number of months. A second line 504 illustrates actual quota adjustments that resulted from a user self-monitoring resource usage and opening manual tickets to request quota increases (e.g., as described with respect to FIG. 4). A third line 506 indicates quota adjustments recommended by a usage-based predictive modeling solution consistent with any of the predictive modeling systems disclosed herein. Each time the model is run, it is provided with a current usage metric (e.g., an average peak usage for the past 24 hours) and the current quota for allotted to the customer subscription.

The trends shown by the first line 502 illustrate gradual growth that is less volatile than that shown in FIG. 4. As shown by the second line 504, the customer's quota was increased several times throughout January and March, each time in response to the customer's opening of a manual ticket. As shown, both the manual method illustrated by the second line 504 and the predictive modeling solution illustrated by the third line 506 succeeded preventing the usage from exceeding the quota; however, the predictive modeling solution based on usage history is again more efficient in terms of resource consumption.

Figure 6:
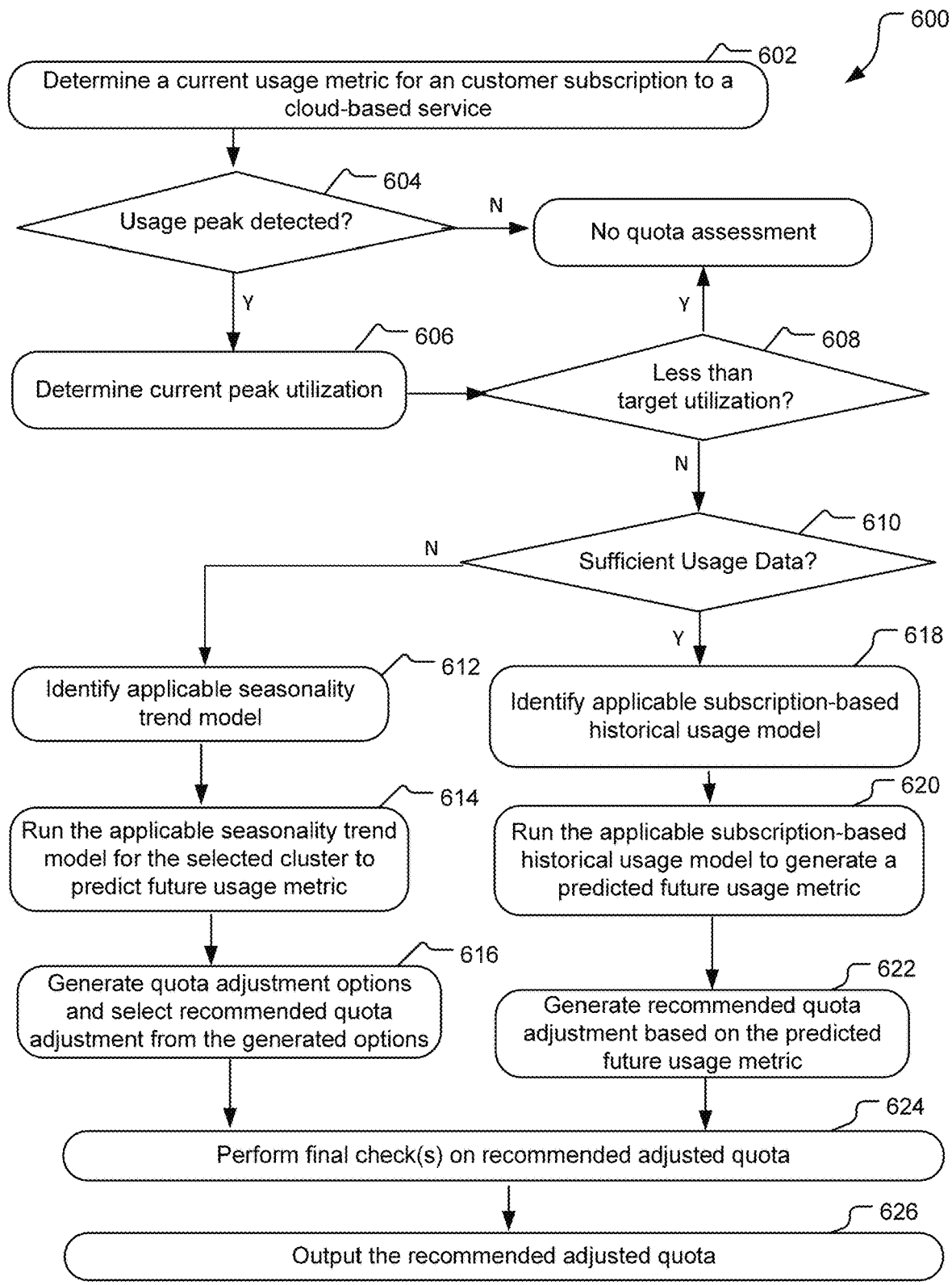
FIG. 6 illustrates example operations for automated quota adjustment of individual customer subscriptions based on historical usage data for those individual subscriptions and/or seasonality usage data for a related industry.

FIG. 6 illustrates example operations 600 for automated quota adjustment of individual customer subscriptions 108 based on historical usage data for those individual subscriptions and/or seasonality usage data for a related industry.

A determining operation 602 determines a current usage metric for an individual subscription to web-based service that is supported by compute resources of a cloud-based compute platform. The current usage metric is representative of a recent resource usage for the account and may, for example, be a value representing a peak usage or an average hourly peak usage for the past 24 hours. A determination operation 604 determines whether the current usage metric is higher than recently-reported like-values (e.g., daily usage metrics) over a recent history interval. For example, the determination operation 605 determines whether the current usage metric is higher than it has been at any time in the past three months. If not, no further action is taken (e.g., predictive modeling is not performed).

If, however, the determination operation 604 determines that the current usage metric is higher than other recently-reported values of a same type over the recent history interval, the operations 600 proceed to a peak utilization determination operation 606. The peak utilization determination operation 606 determines a current peak utilization of the currently allocated quota (e.g., representing a percent of allocated resources being used) over the same time period as that represented by the current usage metric. If, for example, the current usage metric represents an average hourly peak usage over the past 24 hours, the peak utilization determination operation 606 determines a peak utilization over the past 24 hours, such as by taking a ratio of the current usage metric to the quota that is currently allocated to the customer subscription.

A determination operation 608 determines whether the current peak utilization is less than a predefined target utilization. The target utilization may vary from one implementation to another based on a variety of factors, such as resource availability. In one implementation, the predefined target utilization is set based at least in part on the capacity of the regional cloud compute facility that is physically housing the resources allocated to the customer subscription. For example, a cloud compute center in a given region (e.g., northwest U.S., south Asia, eastern Europe) may have fluctuating available capacities due to support issues such as schedule maintenance or temporary computational support of a large-scale regional compute operation, such as helping intelligence operations in a war-ridden area, for example. A cloud compute facility with a lesser degree of available overall capacity may impose a higher target utilization, such as 70% or 80%, ensuring more efficient resource usage (e.g., as many resources allocated that go unused) at the slightly increased cost of performance issues due to usage quotas being potentially exceeded. In contrast, a cloud compute facility with a higher degree of available overall capacity may impose a lower target utilization, such as 50% and 60%, allowing a higher over-allocation margin to potentially support unexpected (volatile) usage spikes. In other scenarios, a cloud compute facility may selectively lower its target utilization at certain times of year, such as around the holidays, to accommodate expected large spikes in usage (e.g., due to holiday shopping).

If the determination operation 608 determines that the current peak utilization is below the target utilization for the regional compute center, no further action is taken. If, in contrast, the determination operation 608 determines that the current peak utilization exceeds the target utilization, a determination operation 610 determines whether there exists a threshold quantity of stored historical usage data on which a reliable subscription-based historical usage model can be trained. This threshold quantity of historical usage data may vary in different implementations but is, for example, a quantity of collected data sufficient to guarantee (based on repeated experimentation) a baseline level of confidence in the accuracy of a predictive output generated by a subscription-based historical usage model that is trained on such data. In one implementation, the threshold quantity of historical usage data is satisfied when there exists historical usage data collected for the customer subscription over the past 90 days.

In one implementation, historical usage data is collected in association with each different customer subscription. When a threshold quantity of such data has been accumulated and stored (e.g., 90 days of data), a predictive model is automatically trained on such data and stored in association with a subscription ID for the customer subscription. In this case, a newer customer subscription may not have a model trained on its own usage history because the stored usage history data is insufficient to reliably facilitate reliable predictive modeling.

If the determination operation 610 finds that the threshold quantity of the historical usage data has been collected for the customer subscription over the recent time interval (e.g., the past month, 3 months, 6 months), a model identification operation 618 identifies an applicable subscription-based historical usage model that has been trained on the historical usage data of the customer subscription. If no such model has yet been trained, a new historical usage model may be trained on such data before the operations 600 proceed to the next step.

Following the predictive model identification operation 618, a modeling execution operation 620 executes the identified subscription-based historical usage model and the model outputs a predictive future usage metric, such as a metric forecasting predicted usage for the customer subscription over the next 24 hours. A quota generation operation 622 generates one or more recommended quota adjustments based on the predictive future usage metric output by the pre-trained subscription-based historical usage model. In one implementation, the recommended adjusted quota is further selected, in part, based on the target utilization (e.g., determined at 608) for the cloud compute facility supporting the customer subscription. For example, the recommended adjusted quota may be selected to ensure that the customer subscription is allotted sufficient resources to support an actual usage consistent with the predicted usage and also to ensure that the predicted usage and the adjusted quota satisfy a target quota (e.g., a ratio of the predicted usage to adjusted quota is 40% or some other target).

Referring back to the determination operation 610, if there is insufficient usage data for the customer subscription (e.g., either no usage data or a quantity less than a predefined quantity on which the subscription-based usage models depend for reliable execution), a seasonality trend model is used to generate the predicted future usage metric. An identification operation 612 identifies a most-applicable trained seasonality trend model.

In one implementation, there exists a single trained seasonality model for each different industry (e.g., a model trained on all customer subscriptions for the industry or a random sampling representee of all customer subscriptions for the industry). In this case, identifying the most-applicable trained seasonality trend model entails identifying the model that has been trained for the industry associated with the services provided in connection with the customer subscription.

In another implementation, there exist multiple trained seasonality models for each different industry. For example, customer subscriptions may be grouped based on industry, further sorted into sub-groups based on similarities/dissimilarities in usage characteristics, and a different seasonality model may be trained with respect to each sub-group. In one implementation of this approach, a clustering analysis is performed with respect to customer subscriptions associated with different services within a same industry to create clusters of the customer subscriptions that have similar usage characteristics. For example, the industry "food and beverage retail" may be associated with 10,000 accounts spread across 15 different clusters, with each cluster including subscriptions with identified similarities in one or more usage similarities used as a basis for the clustering analysis (e.g., usage characteristics such as similar daily usage, mean peak daily usage, or other distinguishing use-based characteristics). The clusters may be randomly sampled to select a training dataset for each cluster-based seasonality model. For example, each cluster may include 100+ subscriptions with similar usage characteristics in a same industry, and the random sampling may select 5 subscriptions within each cluster that are used to train a seasonality model for the cluster. In this implementation, the identification operation 612 includes selecting, from a database, the industry-specific cluster with a closest affiliation to the customer subscription. For example, a cluster with a closest affiliation to the current subscription may be identified by comparing the current usage metric for the customer subscription to a mean peak daily usage computed with respect to each cluster to identify the most similar cluster. Once the industry-specific cluster with the closest affiliation is identified, the identification operation 612 entails selecting the seasonality model that has been trained for that cluster.

Following the seasonality model identification operation 612, a modeling execution operation 614 executes the selected seasonality model. The selected seasonality model generates a predicted future usage metric for the customer subscription. Since the seasonality trend model is trained over time series usage data sampled across various customer subscriptions associated with the same industry, the forecasting provided by this model may take into account trends observable in the training data sets that periodically repeat in the industry (seasonality windows). If, for example, the industry is "online media streaming," the industry-wide usage data may reflect a weekly seasonality window that peaks on the weekend when more individuals watch online entertainment. If this seasonality window predicts a 10-20% increase in video streaming on Friday and Saturday nights and the day is currently Thursday, the seasonality trend model may generate a predicted future resource usage metric that predicts an increase of 10-20% from the current peak utilization within the next 24 hours.

After the seasonality trend model predicts the future resource usage metric for the customer subscription, a quota adjustment generation operation 616 generates one or more recommended quota adjustments (quota adjustment options that may be selected in the alternative). At least one of the recommended quota adjustment is based on the predicted future usage metric that is output by the seasonality trend model. However, since usage predictions rendered by the seasonality trend models are generated based on multiple subscriptions that may have different usage characteristics, the operations 600 may in benefit from an ensemble approach that selects the most generous quota adjustment of multiple different adjustments, thereby reducing the likelihood that actual usage may exceed the adjusted quota.

In one such implementation that employs the aforementioned ensemble approach, the quota adjustment generation operation 616 generates three alternative quota adjustments and ultimately selects the quota adjustment that is most conservative (e.g., guaranteeing a lowest likelihood of usage exceeding the new quota or most generous in terms of total quota allotted). A first generated quota adjustment is based on the predictive usage metric output by the operation 614; a second generated quota adjustment is based on a standard (default) quota incrementation; and a third generated quota adjustment is generated based on a target utilization. For example, the second quota adjustment based on the standard incrementation may provide for increasing the quota by 5% each time usage spikes within a set margin (e.g., 20%) of the current quota. Alternatively, the third quota adjustment may be generated as a function of the current usage metric and a target utilization. If, for example, the current quota is 10 TB and current usage metric (peak usage for past 24 hours) is 6 TB, the utilization is 60%. If, in such as system, the target utilization is 40%, this approach entails adjusting the quota up to 15 TB to maintain the target (because 6/15=40%). The quota adjustment selection operation 622 provides for generating a medley of the three types of quota adjustments described above (e.g., standard incrementation, seasonality model output, and target utilization) and selecting the adjustment that provides the customer subscription with the greatest increase in resources (e.g., the most generous adjustment).

After the recommended adjusted quota is selected via the quota recommendation operation 622, a verification check operation 624 performs one or more logic checks to identify predefined scenarios where the recommended adjusted quota should not be implemented.

In one implementation, the verification check operation 624 compares seasonality trend data for the relevant industry to recently-collected usage history data for the customer subscription. If there exist particularly excessive and/or dramatic deviations between recent usage trends observed in relevant (same-industry) seasonality trend data and the customer subscription usage history data, this may indicate that the usage of the customer subscription is fraudulent. Assume, for example, industry trend data indicates that customer subscriptions to a type of services in a given industry have decreased gradually by an average of 30 percent over some interval, such as the past 1 week. If resource usage history for an individual customer subscription in the same industry reflects an 85% increase over the same one-week period, this may indicate that the usage is potentially fraudulent. For example, it may be that a username and password of the customer subscription has been compromised and the subscription being used fraudulently by many nefarious individuals (thus explaining the large uptick in usage). In these cases where identified trends in the relevant industry's customer subscription seasonality data deviate by large margins (e.g., in excess of a threshold) from the actual usage of an individual customer subscription, the verification check operation 624 may automatically decline to alter the quota per the recommended adjustment or, alternatively, flag the usage as potentially fraudulent and directed the recommended quota adjustment to a third party, such as a human administrator, for further review.

In the same or another implementation, the verification check operation 624 checks the recommended adjusted quota against a max regional quota that is set by the cloud compute facility providing the resources for the customer subscription. If, for example, a regional facility is experiencing exceptionally high demand or limited capacity for other reasons, the facility may impose a maximum quota allocation. If the recommended adjusted quota exceeds this maximum, the recommended adjusted quota may be lowered, such as to equal the max regional quota value.

After the verification check operation 624 performs the final checks, an output operations 626 outputs the recommended adjusted quota. The recommended adjusted quota is either automatically implemented or forwarded to a human for review and discretionary implementation (such as in cases where the usage is flagged as potentially fraudulent).

Figure 7:
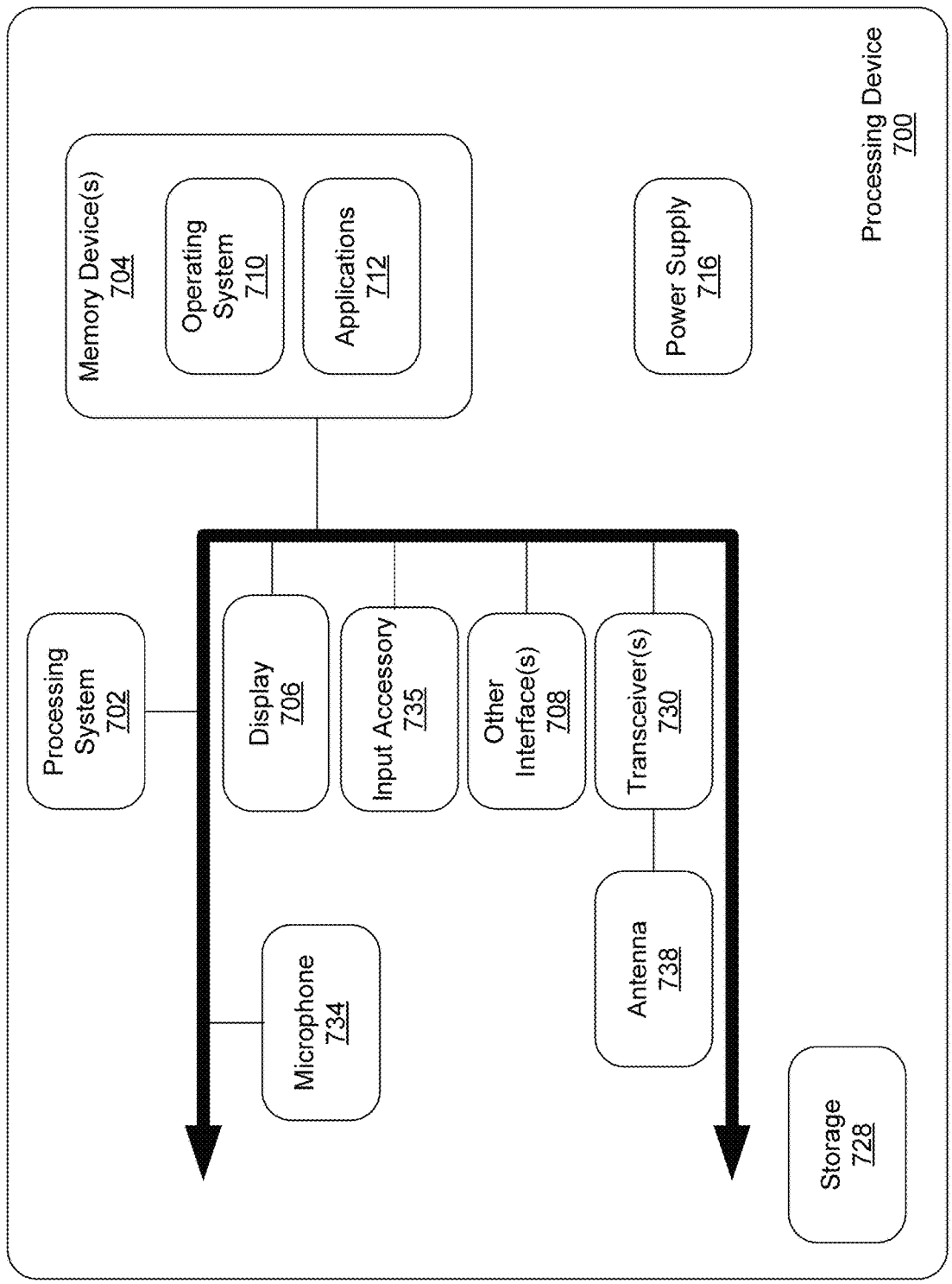
FIG. 7 illustrates an example schematic of a processing device suitable for implementing aspects of the disclosed technology. In one implementation, the processing device executes some or all aspects of the quota managers described herein.

FIG. 7 illustrates an example schematic of a processing device 700 suitable for implementing aspects of the disclosed technology. In one implementation, the processing device 700 executes some or all aspects of the quota managers described herein (e.g., FIG. 1, quota manager 112; FIG. 2, quota manager 212).

The processing device 700 includes a processing system 702, memory 704, the display 706, and other interfaces 708 (e.g., buttons). The memory 704 generally includes both volatile memory (e.g., RAM) and non-volatile memory (e.g., flash memory). An operating system 710 may reside in the memory 704 and be executed by the processing system 702. One or more applications 712, such as the quota manager 112 of FIG. 1, may be loaded in the memory 704 and executed on the operating system 710 by the processing system 702.

The processing device 700 includes a power supply 716, which is powered by one or more batteries or other power sources and which provides power to other components of the processing device 700. The power supply 716 may also be connected to an external power source that overrides or recharges the built-in batteries or other power sources.

The processing device 700 includes one or more communication transceivers 730 and an antenna 732 to provide network connectivity (e.g., a mobile phone network, Wi-Fi®, BlueTooth®). The processing device 700 may also include various other components, such as a positioning system (e.g., a global positioning satellite transceiver), one or more accelerometers, one or more cameras, an audio interface (e.g., a microphone 734, an audio amplifier and speaker and/or audio jack), and storage devices 728. Other configurations may also be employed. In an example implementation, a mobile operating system, various applications and other modules and services may be embodied by instructions stored in memory 704 and/or storage devices 728 and processed by the processing system 702. The memory 704 may be memory of host device or of an accessory that couples to a host.

The processing device 700 may include a variety of tangible computer-readable storage media and intangible computer-readable communication signals. Tangible computer-readable storage can be embodied by any available media that can be accessed by the processing device 700 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the processing device 700. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

(A1) According to one implementation, a method for automatically adjusting a quota of compute resources allocated by a cloud compute resource provider to an individual customer subscription includes: determining a current usage metric for the individual customer subscription for a recent time interval; determining whether a subscription-based historical usage model has been trained on historical usage data of the individual customer subscription; and responsive to determining that the subscription-based historical usage model has been trained, providing the current usage metric to the subscription-based historical usage model. The method further provides for executing the subscription-based historical usage model to generate a future resource usage metric for the individual customer subscription and outputting a recommended adjusted resource quota for the individual customer subscription, where the future resource usage metric satisfies a target utilization of the recommended adjusted resource quota. The adjusted resource quota may provide for either an increase or decrease in the total quantity of resources currently allocated to the customer subscription. The target utilization may represent a target percentage of the total allocated resources that the customer subscription is expected to use over the future time interval (e.g., the next 24 hours). Assume for example that the current quota is 4 GB, the target utilization is 60% and the future resource usage metric predicts a maximum usage of 6 GB over the next 24 hours. In this case, the adjusted recommended resource quota may be 10 GB.

The method of A1 is advantageous because it facilitates automatic adjustments to resource quotas allocated to cloud customers that subscribe to different types of web-based services. These automatic adjustments largely reduce accidental usage overages while eliminating friction (conflict) that may arise between individual customers and cloud resource providers in systems that require customers to monitor their own usage and/or manually request quota increases in anticipation of increased usage. Additionally, the method of A1 provides for adjusting quotas based on outputs of a predictive model, which facilitates more granular yet adjustments to quota that are consistent with actual usage, therefore improving the efficiency of resource usage as compared to other approaches.

(A2) In some implementations of A1, the method further provides for determining a tenant that the individual customer subscription is associated with; identifying an industry associated with a web-based service provided by the tenant; identifying an industry-based seasonality trend model that has been trained on historical usage data for a plurality of customer subscriptions associated with the industry; and responsive to determining that the subscription-based historical usage model has not been trained for the customer subscription, executing the identified industry-based seasonality trend model to generate the future resource usage metric.

The method of A2 is advantageous because it leverages the existence of certain usage trends across industries to make usage predictions for customer subscriptions that lack sufficient usage data to serve as a training basis for single-subscription historical usage model (as in the approach of A1).

(A3) In still other implementations of A2 or A3, identifying the industry-based seasonality trend model further comprises identifying, in a database, a select sub-group of customer subscriptions from among multiple sub-groups of customer subscriptions associated with the identified industry. The select sub-group is characterized by a usage characteristic that most closely matches a usage characteristic of the customer subscription, Identifying the industry-based seasonality trend model further comprises identifying a select seasonality model that has been trained on historical usage data collected for customer subscriptions in the selected sub-group.

The method of A3 is advantageous because it leverages industry-based predictive modeling on a more granular level by training seasonality models on usage data for customer subscriptions that are associated with a same industry but that are also characterized by similar usage characteristics (e.g., a similar peak quantity of usage, similar usage patterns) such that each model is trained in associated with customer subscriptions that are used similarly, which may further increase the accuracy of the predicted usage metric that is generated.

(A5) In still other implementations, the methods of A1-A4 further provide for identifying an industry associated with a service provided to a customer through the individual customer subscription; identifying seasonality data collected for the industry, the seasonality data including historical usage for a plurality of customer subscriptions associated with the industry; and using the seasonality data identified for the industry to identify an industry-specific seasonality window identifying a period of time in which resource usage trends repeat, the future resource usage metric being generated at least in part based on the industry-specific seasonality window.

The method of A5 is advantageous because the identification of a seasonality window for a particular industry can allow for a more accurate prediction of the usage (e.g., peaks and valleys) associated with a customer subscription to a service provided within that industry.

(A6) In still other implementations, the methods of A1-A5 provide for comparing the historical usage data collected for the individual customer subscription over a time period to the seasonality data for the industry collected over the time period; detecting a fraudulent usage of the individual customer subscription based on the comparison; and denying the recommended adjusted resource quota in response to detecting the fraudulent usage.

The method of A6 is advantageous because it uses the seasonality data for the relevant industry as a baseline usage that is to be generally expected of the customer subscription. If a large discrepancy exists between the usage of the customer subscription and the usage trends observed across the industry, this may serve as a red flag that the customer subscription has been compromised and/or that the resources allocated to the customer account are being used for nefarious purposes.

(A7) In still other implementations, the methods of A1-A6 further provide for selecting the recommended adjusted resource quota for the individual customer subscription from a plurality of different recommendations generated by the subscription-based historical usage model. The selection is based at least in part on a target utilization set by a cloud compute facility supporting compute activities of the individual customer subscription.

The method of A7 is advantageous because it allows different cloud compute facilities to select slightly different quota adjustments based on the predictive usage metrics generated by the same modeling solutions. This allows cloud compute facilities to regulate quotas based on locally-set utilization metrics while adopting a primarily automated, uniform, and efficient approach to quota adjustment.

According to some implementations, a quota adjustment system automatically adjusts a quota of compute resources allocated by a cloud compute resource provider to an individual customer subscription. The quota adjustment system includes circuitry configured to perform any of the operations discussed above (e.g., methods A1-A7).

In yet another aspect, some implementations include a computer-readable storage medium for storing computer-readable instructions. The computer-readable instructions, when executed by one or more hardware processors, perform any of the methods described herein (e.g., methods A1-A7).

The above specification, examples, and data provide a complete description of the structure and use of exemplary implementations. Since many implementations can be made without departing from the spirit and scope of the claimed invention, the claims hereinafter appended define the invention. Furthermore, structural features of the different examples may be combined in yet another implementation without departing from the recited claims.

What is claimed is:

1. A method for automatically adjusting a quota of compute resources allocated by a cloud compute resource provider to an individual customer subscription, the method comprising:
    determining a tenant that the individual customer subscription is associated with, the tenant being a web-based service provider leasing compute resources of the cloud compute resource provider;
    identifying an industry associated with a web-based service provided by the tenant associated with the individual customer subscription;
    responsive to determining that there exists less than a threshold quantity of historical usage data for the individual customer subscription, identifying, from a plurality of industry-based seasonality trend models trained on historical usage data associated with different industries, an industry-based seasonality trend model that has been trained on historical usage data for a plurality of customer subscriptions associated with the industry;
    executing the industry-based seasonality trend model to generate a future resource usage metric predicting a usage of the individual customer subscription over a future time interval; and
    outputting a recommended adjusted resource quota for the individual customer subscription, the future resource usage metric satisfying a target utilization of the recommended adjusted resource quota.

2. The method of claim 1, wherein the method further provides for:
    responsive to determining that there exists greater than the threshold quantity of the historical usage data for the individual customer subscription and that a subscription-based historical usage model has been trained on the historical usage data of the individual customer subscription:
    determining a current usage metric for the individual customer subscription for a recent time interval;
    providing the current usage metric to the subscription-based historical usage model; and
    executing the subscription-based historical usage model to generate the future resource usage metric.

3. The method of claim 1, wherein identifying the industry-based seasonality trend model further comprises:
    identifying, in a database, a select sub-group of customer subscriptions from among multiple sub-groups of customer subscriptions associated with the identified industry, the select sub-group being characterized by a usage characteristic that most closely matches a usage characteristic of the individual customer subscription,
    wherein identifying the industry-based seasonality trend model further comprises identifying a select seasonality model that has been trained on historical usage data collected for customer subscriptions in the select sub-group.

4. The method of claim 1, wherein the method further provides for:
    wherein the historical usage data for a plurality of customer subscriptions associated with the industry identifies seasonality data collected for the industry, the seasonality data encompassing instances of an industry-specific seasonality window in which resource usage trends repeat, the future resource usage metric being generated at least in part based on the industry-specific seasonality window.

5. The method of claim 2, wherein the method further comprises:
adjusting the subscription-based historical usage model to remove seasonality trends within the industry-specific seasonality window prior to training the subscription-based historical usage model.

6. The method of claim 4, further comprising:
comparing the historical usage data collected for the individual customer subscription over a time period to the seasonality data for the industry collected over the time period;
detecting a fraudulent usage of the individual customer subscription based on the comparison; and
denying the recommended adjusted resource quota in response to detecting the fraudulent usage.

7. The method of claim 2, wherein the method further provides for:
selecting the recommended adjusted resource quota for the individual customer subscription from a plurality of different recommendations generated by the subscription-based historical usage model, the selection being based at least in part on a target utilization set by a cloud compute facility supporting compute activities of the individual customer subscription.

8. A system for automatically adjusting a quota of compute resources allocated by a cloud compute resource provider to an individual customer subscription, the system comprising:
a quota manager stored in memory and executable to:
identify a tenant that the individual customer subscription is associated with, the tenant being a web-based service provider leasing compute resources of the cloud compute resource provider;
identify an industry associated with a web-based service provided by the tenant associated with the individual customer subscription;
responsive to determining that there exists less than a threshold quantity of historical usage data for the individual customer subscription, identify, from a plurality of industry-based seasonality trend models trained on historical usage data associated with different industries, an industry-based seasonality trend model that has been trained on historical usage data for a plurality of customer subscriptions associated with the industry;
execute the industry-based seasonality trend model to generate a future resource usage metric predicting a usage of the individual customer subscription over a future time interval; and
output a recommended adjusted resource quota for the individual customer subscription, the future resource usage metric satisfying a target utilization of the recommended adjusted resource quota.

9. The system of claim 8, wherein the quota manager is further executable to:
responsive to determining that there exists greater than the threshold quantity of usage data for the individual customer subscription and that a subscription-based historical usage model has been trained on the historical usage data of the individual customer subscription:
determine a current usage metric for the individual customer subscription for a recent time interval;
provide the current usage metric to the subscription-based historical usage model; and
execute the subscription-based historical usage model to generate the future resource usage metric.

10. The system of claim 9, wherein the quota manager is further executable to:
identify, in a database, a select sub-group of customer subscriptions from among multiple sub-groups of customer subscriptions associated with the industry, the select sub-group being characterized by a usage characteristic that most closely matches a usage characteristic of the individual customer subscription, wherein the industry-based seasonality trend model is a model trained on historical usage data collected for customer subscriptions in the select sub-group.

11. The system of claim 9,
wherein the historical usage data for a plurality of customer subscriptions associated with the industry identifies seasonality data collected for the industry, the seasonality data encompassing instances of an industry-specific seasonality window in which resource usage trends repeat, the future resource usage metric being generated at least in part based on the industry-specific seasonality window.

12. The system of claim 11, wherein the quota manager is further executable to: adjust the subscription-based historical usage model to remove seasonality trends within the instances of the industry-specific seasonality window prior to training the subscription-based historical usage model.

13. The system of claim 11, wherein the quota manager is further executable to:
compare the historical usage data collected for the individual customer subscription over a time period to the seasonality data for the industry collected over the time period;
detect a fraudulent usage of the individual customer subscription based on the comparison; and
deny the recommended adjusted resource quota in response to detecting the fraudulent usage.

14. The system of claim 9, wherein the quota manager is further executable to:
select the recommended adjusted resource quota for the individual customer subscription from a plurality of different recommendations generated by the subscription-based historical usage model, the selection being based at least in part on a target utilization set by a cloud compute facility supporting compute activities of the individual customer subscription.

15. One or more tangible computer-readable storage media encoding computer-executable instructions for executing a computer process for automatically adjusting a quota of compute resources allocated by a cloud compute resource provider to an individual customer subscription, the computer process comprising:
determining a tenant that the individual customer subscription is associated with, the tenant being a web-based service provider leasing compute resources of the cloud compute resource provider;
determining whether a subscription-based historical usage model has been trained on historical usage data of the individual customer subscription;
responsive to determining that there exists less than a threshold quantity of the historical usage data for the individual customer subscription:
identifying an industry associated with a web-based service provided by the tenant;

identifying, from a plurality of industry-based seasonality trend models trained on historical usage data associated with different industries, an industry-based seasonality trend model that has been trained on historical usage data for a plurality of customer subscriptions associated with the industry; and executing the industry-based seasonality trend model to generate a future resource usage metric predicting a usage of the individual customer subscription over a future time interval; and outputting a recommended adjusted resource quota for the individual customer subscription, the future resource usage metric satisfying a target utilization of the recommended adjusted resource quota.

16. The one or more tangible computer-readable storage media of claim 15, wherein the computer process further comprises:

determining a current usage metric for the individual customer subscription for a recent time interval;

responsive to determining that there exists greater than the threshold quantity of usage data for the individual customer subscription and that a subscription-based historical usage model has been trained on the historical usage data for the individual customer subscription, providing the current usage metric to the subscription-based historical usage model and executing the subscription-based historical usage model to generate the future resource usage metric.

17. The one or more tangible computer-readable storage media of claim 16, wherein identifying the industry-based seasonality trend model further comprises:

identifying, in a database, a select sub-group of customer subscriptions from among multiple sub-groups of customer subscriptions associated with the industry, the select sub-group being characterized by a usage characteristic that most closely matches a usage characteristic of the individual customer subscription, and wherein identifying the industry-based seasonality trend model further comprises identifying a select seasonality model that has been trained on historical usage data collected for customer subscriptions in the select sub-group.

18. The one or more tangible computer-readable storage media of claim 15, wherein the computer process further comprises:

identifying an industry associated with a service provided to a customer through the individual customer subscription; and identifying seasonality data collected for the industry, the seasonality data including historical usage for a plurality of customer subscriptions associated with the industry;

using the seasonality data identified for the industry to identify an industry-specific seasonality window identifying a period of time in which resource usage trends repeat, the future resource usage metric being generated at least in part based on the industry-specific seasonality window; and adjusting the future resource usage metric that is generated by the subscription-based historical usage model based at least in part on the industry-specific seasonality window.

19. The one or more tangible computer-readable storage media of claim 18, wherein the computer process further comprises:

comparing the historical usage data collected for the individual customer subscription over a time period to the seasonality data for the industry collected over the time period;

detecting a fraudulent usage of the individual customer subscription based on the comparison; and denying the recommended adjusted resource quota in response to detecting the fraudulent usage.

20. The one or more tangible computer-readable storage media of claim 18, wherein the computer process further provides for:

selecting the recommended adjusted resource quota for the individual customer subscription from a plurality of different recommendations generated by the subscription-based historical usage model, the selection being based at least in part on a target utilization set by a cloud compute facility supporting compute activities of the individual customer subscription.

* * * * *